(12) United States Patent
Ganor et al.

(10) Patent No.: US 9,436,851 B1
(45) Date of Patent: Sep. 6, 2016

(54) GEOMETRIC ENCRYPTED CODED IMAGE

(71) Applicant: AIC Innovations Group, Inc., New York, NY (US)

(72) Inventors: Yaniv Ganor, Brookline, MA (US); Maurice Lepouttre, Brooklyn, NY (US)

(73) Assignee: AIC Innovations Group, Inc., New York, NY (US)

( * ) Notice: Subject to any disclaimer, the term of this patent is extended or adjusted under 35 U.S.C. 154(b) by 456 days.

(21) Appl. No.: 13/903,620

(22) Filed: May 28, 2013

Related U.S. Application Data

(60) Provisional application No. 61/820,600, filed on May 7, 2013.

(51) Int. Cl.
| | |
|---|---|
| *G06K 7/10* | (2006.01) |
| *G06K 5/00* | (2006.01) |
| *G06K 19/06* | (2006.01) |
| *G06K 7/14* | (2006.01) |
| *G06K 9/34* | (2006.01) |
| *G06T 11/20* | (2006.01) |

(52) U.S. Cl.
CPC ............... *G06K 5/00* (2013.01); *G06K 7/1417* (2013.01); *G06K 9/34* (2013.01); *G06K 19/06037* (2013.01); *G06T 11/20* (2013.01)

(58) Field of Classification Search
CPC ........ G06K 5/00; G06K 7/1417; G06K 9/34; G06K 9/3216; G06K 19/06056; G06K 19/06037; G06K 19/06009; G06K 19/06131
USPC ................................ 235/465.01–462.49, 494
See application file for complete search history.

(56) References Cited

U.S. PATENT DOCUMENTS

| | | |
|---|---|---|
| 3,814,845 A | 6/1974 | Hurlbrink et al. |
| 5,065,447 A | 11/1991 | Barnsley et al. |
| 5,441,047 A | 8/1995 | David et al. |
| 5,544,649 A | 8/1996 | David et al. |
| 5,619,991 A | 4/1997 | Sloane |
| 5,646,912 A | 7/1997 | Cousin |
| 5,752,621 A | 5/1998 | Passamante |
| 5,764,296 A | 6/1998 | Shin |
| 5,810,747 A | 9/1998 | Brundy et al. |
| 5,911,132 A | 6/1999 | Sloane |

(Continued)

OTHER PUBLICATIONS

Ammouri, S.; Biloduau, G. -A, "Face and Hands Detection and Tracking Applied to the Monitoring of Medication Intake," Computer and Robot Vision, 2008. CRV '08. Canadian Conference, 147(154):28-30, May 2008.

(Continued)

*Primary Examiner* — Laura Gudorf
(74) *Attorney, Agent, or Firm* — Fish & Richardson P.C.

(57) ABSTRACT

A method, system and computer program for defining a geometric code is provided. The method for generating a geometric code includes the steps of defining a first geometric shape, defining a size of a second geometric shape as a change in size from the first geometric shape, defining a position of the second geometric shape as a change in position from the first geometric shape, and displaying the first geometric shape and the second geometric shape. A system for imaging the defined geometric code includes a processor performing the steps of segmenting the imaged code, partitioning the segmented imaged code, determining a gray level of each portion of the partitioned segmented imaged code, and determining a code represented by each segmented portion of the partitioned segmented imaged code.

9 Claims, 10 Drawing Sheets

(a)   (b)   (c)

(56) References Cited

U.S. PATENT DOCUMENTS

| | | | |
|---|---|---|---|
| 5,961,446 A | 10/1999 | Beller et al. |
| 6,151,521 A | 11/2000 | Guo et al. |
| 6,154,558 A | 11/2000 | Hsieh |
| 6,233,428 B1 | 5/2001 | Fryer |
| 6,283,761 B1 | 9/2001 | Joao |
| 6,380,858 B1 | 4/2002 | Yarin et al. |
| 6,409,661 B1 | 6/2002 | Murphy |
| 6,421,650 B1 | 7/2002 | Goetz et al. |
| 6,483,993 B1 | 11/2002 | Misumi et al. |
| 6,484,144 B2 | 11/2002 | Martin et al. |
| 6,535,637 B1 | 3/2003 | Wootton et al. |
| 6,611,206 B2 | 8/2003 | Eshelman et al. |
| 6,705,991 B2 | 3/2004 | Bardy |
| 6,879,970 B2 | 4/2005 | Shiffman et al. |
| 6,988,075 B1 | 1/2006 | Hacker |
| 7,184,047 B1 | 2/2007 | Crampton |
| 7,184,075 B2 | 2/2007 | Reiffel |
| 7,256,708 B2 | 8/2007 | Rosenfeld et al. |
| 7,277,752 B2 | 10/2007 | Matos |
| 7,304,228 B2 | 12/2007 | Bryden et al. |
| 7,307,543 B2 | 12/2007 | Rosenfeld et al. |
| 7,317,967 B2 | 1/2008 | DiGianfilippo et al. |
| 7,340,077 B2 | 3/2008 | Gokturk |
| 7,359,214 B2 | 4/2008 | Heard |
| 7,395,214 B2 | 7/2008 | Shillingburg |
| 7,415,447 B2 | 8/2008 | Shiffman et al. |
| 7,448,544 B1 | 11/2008 | Louie et al. |
| 7,562,121 B2 | 7/2009 | Berisford et al. |
| 7,627,142 B2 | 12/2009 | Kurzweil et al. |
| 7,657,443 B2 | 2/2010 | Crass et al. |
| 7,692,625 B2 | 4/2010 | Morrison et al. |
| 7,747,454 B2 | 6/2010 | Bartfeld et al. |
| 7,761,311 B2 | 7/2010 | Clements et al. |
| 7,769,465 B2 | 8/2010 | Matos |
| 7,774,075 B2 | 8/2010 | Lin et al. |
| 7,874,984 B2 | 1/2011 | Elsayed et al. |
| 7,881,537 B2 | 2/2011 | Ma et al. |
| 7,908,155 B2 | 3/2011 | Fuerst et al. |
| 7,912,733 B2 | 3/2011 | Clements et al. |
| 7,956,727 B2 | 6/2011 | Loncar |
| 7,983,933 B2 | 7/2011 | Karkanias et al. |
| 8,321,284 B2 | 11/2012 | Clements et al. |
| 8,538,775 B2 | 9/2013 | Skomra |
| 2001/0049673 A1 | 12/2001 | Dulong et al. |
| 2001/0056358 A1 | 12/2001 | Dulong et al. |
| 2002/0026330 A1 | 2/2002 | Klein |
| 2002/0093429 A1 | 7/2002 | Matsushita et al. |
| 2002/0143563 A1 | 10/2002 | Hufford et al. |
| 2003/0164172 A1 | 9/2003 | Chumas et al. |
| 2003/0190076 A1 | 10/2003 | Delean |
| 2003/0225325 A1 | 12/2003 | Kagermeier et al. |
| 2004/0100572 A1 | 5/2004 | Kim |
| 2004/0107116 A1 | 6/2004 | Brown |
| 2004/0118916 A1* | 6/2004 | He ................ G06K 7/0004 235/383 |
| 2004/0155780 A1 | 8/2004 | Rapchak |
| 2005/0144150 A1 | 6/2005 | Ramamurthy et al. |
| 2005/0149361 A1 | 7/2005 | Saus et al. |
| 2005/0180610 A1 | 8/2005 | Kato et al. |
| 2005/0182664 A1 | 8/2005 | Abraham-Fuchs et al. |
| 2005/0234381 A1 | 10/2005 | Niemetz et al. |
| 2005/0267356 A1 | 12/2005 | Ramasubramanian et al. |
| 2006/0066584 A1 | 3/2006 | Barkan |
| 2006/0218011 A1 | 9/2006 | Walker et al. |
| 2006/0238549 A1 | 10/2006 | Marks |
| 2007/0008112 A1 | 1/2007 | Covannon et al. |
| 2007/0008113 A1 | 1/2007 | Spoonhower et al. |
| 2007/0030363 A1 | 2/2007 | Cheatle et al. |
| 2007/0118389 A1 | 5/2007 | Shipon |
| 2007/0194034 A1 | 8/2007 | Vasiadis |
| 2007/0233035 A1 | 10/2007 | Wehba et al. |
| 2007/0233049 A1 | 10/2007 | Wehba et al. |
| 2007/0233050 A1 | 10/2007 | Wehba et al. |
| 2007/0233281 A1 | 10/2007 | Wehba et al. |
| 2007/0233520 A1 | 10/2007 | Wehba et al. |
| 2007/0233521 A1 | 10/2007 | Wehba et al. |
| 2007/0265880 A1 | 11/2007 | Bartfeld et al. |
| 2007/0273504 A1 | 11/2007 | Tran |
| 2008/0000979 A1 | 1/2008 | Poisner |
| 2008/0093447 A1 | 4/2008 | Johnson et al. |
| 2008/0114226 A1 | 5/2008 | Music et al. |
| 2008/0114490 A1 | 5/2008 | Jean-Pierre |
| 2008/0138604 A1 | 6/2008 | Kenney et al. |
| 2008/0140444 A1 | 6/2008 | Karkanias et al. |
| 2008/0162192 A1 | 7/2008 | Vonk et al. |
| 2008/0178126 A1 | 7/2008 | Beeck et al. |
| 2008/0201174 A1 | 8/2008 | Ramasubramanian et al. |
| 2008/0219493 A1 | 9/2008 | Tadmor |
| 2008/0275738 A1 | 11/2008 | Shillingburg |
| 2008/0290168 A1 | 11/2008 | Sullivan et al. |
| 2008/0297589 A1 | 12/2008 | Kurtz et al. |
| 2008/0303638 A1 | 12/2008 | Nguyen et al. |
| 2009/0012818 A1 | 1/2009 | Rodgers |
| 2009/0018867 A1 | 1/2009 | Reiner |
| 2009/0043610 A1 | 2/2009 | Nadas et al. |
| 2009/0048871 A1 | 2/2009 | Skomra |
| 2009/0095837 A1 | 4/2009 | Lindgren |
| 2009/0127339 A1 | 5/2009 | Needhan et al. |
| 2009/0128330 A1 | 5/2009 | Monroe |
| 2009/0159714 A1 | 6/2009 | Coyne, III et al. |
| 2009/0217194 A1 | 8/2009 | Martin et al. |
| 2009/0218404 A1* | 9/2009 | Zhang ............... G06K 7/10722 235/462.41 |
| 2009/0245655 A1 | 10/2009 | Matsuzaka |
| 2010/0042430 A1 | 2/2010 | Bartfeld |
| 2010/0050134 A1 | 2/2010 | Clarkson |
| 2010/0057646 A1 | 3/2010 | Martin et al. |
| 2010/0092093 A1 | 4/2010 | Akatsuka et al. |
| 2010/0136509 A1 | 6/2010 | Mejer et al. |
| 2010/0138154 A1 | 6/2010 | Kon |
| 2010/0255598 A1 | 10/2010 | Melker |
| 2010/0262436 A1 | 10/2010 | Chen et al. |
| 2010/0316979 A1 | 12/2010 | Von Bismarck |
| 2011/0021952 A1 | 1/2011 | Vallone |
| 2011/0119073 A1 | 5/2011 | Hanina et al. |
| 2011/0141009 A1 | 6/2011 | Izumi |
| 2011/0153360 A1 | 6/2011 | Haninia et al. |
| 2011/0161109 A1 | 6/2011 | Pinsonneault et al. |
| 2011/0195520 A1 | 8/2011 | Leider et al. |
| 2011/0275051 A1 | 11/2011 | Hanina et al. |
| 2012/0075464 A1 | 3/2012 | Derenne et al. |

OTHER PUBLICATIONS

Batz, et al. "A computer Vision System for Monitoring Medication Intake," in Proc. IEEE 2nd Canadian Conf. on Computer and Robot Vision, Victoria, BC, Canada, 2005, pp. 362-369.

Bilodeau et al. Monitoring of Medication Intake Using a Camera System. Journal of Medical Systems 2011. [retrieved on Feb. 18, 2013] Retrieved from ProQuest Technology Collection.

Chen, Pauline W., "Texting as a Health Tool for Teenagers", The New York Times, Nov. 5, 2009, http://www.nytimes.com/2009/11/05/health/0512/899,510 (3 pages).

Danya International, Inc., "Pilot Study Using Cell Phones for Mobile Direct Observation Treatment to Monitor Medication Compliance of TB Patients", Mar. 20, 2009, www.danya.com/MDOT. asp, (2 pages).

Global Tuberculosis Control: A short update to the 2009 report, World Health Organization, (2009) (48 pages).

Huynh et al., "Real time detection, tracking and recognition of medication intake." World Academy of Science, Engineering and Technology 60 (2009), 280-287.

Mintchell, "Exploring the Limits of Machine Vision", Automation World, Oct. 1, 2011 (6 pages).

Osterberg, Lars and Blaschke, Terrence, "Adherence to Medication", New England Journal of Medicine 2005; 353:487-97, Aug. 4, 2005.

Super-Resolution, Wikipedia, (Oct. 5, 2010) (4 pages).

University of Texas, GuideView, Mar. 15, 2007, http://www.sahs.uth.tmc.edu/MSriram/GuideView, (3 pages).

Valin, et al. "Video Surveillance of Medication intake", Int. Conf. of the IEEE Engineering in Medicine and Biology Society, New York City, USA, Aug. 2006.

(56) References Cited

OTHER PUBLICATIONS

Wang et al. "Recent Developments in human motion analysis." Pattern Recognition 36 (220) 585-601 (Nov. 2001).

Whitecup, Morris S., "2008 Patient Adherence Update: New Approaches for Success", www.guideline.com, The Trend Report Series, (Oct. 1, 2008) (17 pages).

* cited by examiner (a)           (b)

(a)           (b)

| # | C44 code | 0.6x0.6mm cell size, 8MP image | 0.3x0.3mm cell size, 8MP image | 0.6x0.6mm cell size, 1.2MP image |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |

GEOMETRIC ENCRYPTED CODED IMAGE

CROSS REFERENCE TO RELATED APPLICATIONS

This application claims the benefit of U.S. Provisional Patent Application Ser. No. 61/820,600 filed May 7, 2013, titles "Geometric Encrypted Coded Image" to Ganor et al., the entire contents thereof being incorporated herein by reference.

STATEMENT REGARDING FEDERALLY SPONSORED RESEARCH OR DEVELOPMENT

This invention was made with government support under grant number 1R43TR000190-01 awarded by National Center for Advancing Translational Sciences, National Institutes of Health. The Government has certain rights in the invention.

TECHNICAL FIELD

This application relates generally to the identification and authentication of products, and more particularly to the identification and authentication of medication such as medication tablets, pills or other medication, and more particularly to the identification and authentication of such medication using a geometric encrypted coded image. The invention relates generally to any situation in which a multi-step in general, and two-step in particular, identification and authentication process may be employed for any product, object or the like.

BACKGROUND

Counterfeit Medication

A counterfeit medication or a counterfeit drug is a medication or pharmaceutical product which is produced and sold with the intent to deceptively represent its origin, authenticity or effectiveness. A counterfeit drug may contain inappropriate quantities of active ingredients or none at all, may be improperly processed within the body (e.g., absorption by the body), may contain ingredients that are not on the label (which may or may not be harmful), or medication may be supplied with inaccurate or fake packaging and labeling. Counterfeit medicinal drugs include those with less or none of the stated active ingredients, with added, sometimes hazardous, adulterants, substituted ingredients, completely misrepresented, or sold with a false brand name. Otherwise legitimate drugs that have passed their date of expiry are sometimes remarked with false dates. Low-quality counterfeit medication may cause any of several dangerous health consequences including side effects, allergic reactions, in addition to their obvious lack of efficacy due to having less or none of their active ingredients. Medicines which are deliberately mislabeled in order to deceive consumers— including mislabeled but otherwise genuine generic drugs— are counterfeit. Other products may similarly be subject to counterfeiting.

Since counterfeiting is difficult to detect, investigate, quantify, or stop, the quantity of counterfeit medication is difficult to determine. Counterfeiting occurs throughout the world, although there are claims that it is more common in some developing countries with weak regulatory or enforcement regimes. It is estimated that more than 10% of drugs worldwide are counterfeit, and in some countries more than 50% of the drug supply is counterfeit. In 2003, the World Health Organization estimated that the annual earnings of counterfeit drugs were over US$32 billion. Other products are similarly subject to substantial counterfeiting, potentially damaging the reputation of the genuine product manufacturer and/or harming an misleading customers.

The considerable difference between the cost of manufacturing counterfeit medication and price that counterfeiters charge is a lucrative incentive. Fake antibiotics with a low concentration of the active ingredients can do damage worldwide by stimulating the development of drug resistance in surviving bacteria. Courses of antibiotic treatment which are not completed can be dangerous or even life threatening. If a low potency counterfeit drug is involved, completion of a course of treatment cannot be fully effective. Counterfeit drugs have even been known to have been involved in clinical drug trials. Other counterfeited products similarly provide a significant incentive to counterfeiters.

Medication Identification

In addition to the problem with counterfeit medications, simple identification of medication is also an extremely large problem. More than 80% of adults in the U.S. take at least one pill a week, whether prescription, OTC, vitamin or herbal. Yet the pills they are taking are difficult to identify based on their visual characteristics alone. Pill identification, or the inability to correctly visually identify a pill, is a large contributing factor to medication errors. These errors can occur anywhere along the drug-taking process. Difficulty with pill identification is further exacerbated when patients are older, have some form of impairment, take multiple drugs or have limited health literacy. 1.5 million people are harmed each year because of medication errors. The cost of treating drug-related injuries in hospitals is approximately $3.5 billion per year. The actual number of medication errors is presumably much higher since not all medication errors lead to injury or death. A pill's poor labeling and packaging are thought to cause one third of medication errors, while studies have also shown that a pill's shape and color are important factors in drug identification.

Coding products for purposes other than counterfeiting is also very important. Packaging, parts identification, advertising and the like are areas where coding of products is desirable. In each such case, coding of the products allows for entry and retrieval of information from a database or the like, thus ensuring proper tracking and review of the status of one or more of such products.

Existing Identification and Anti-Counterfeiting Technologies

There are several technologies that have been employed in an effort to combat the counterfeit drug problem, and to allow for identification of medication. A review of these technologies is provided below in Table 1.

TABLE 1

|  | Overt | Covert | Forensic | Track and Trace | |
|---|---|---|---|---|---|
|  | Visible Marking | Invisible Ink | Taggants | Barcode ID | RFID |
| Technology | Optical | Optical | Chem/Physics | Optical | Electronic |
| Data Reading Method | Visual | Imaging | Lab | Imaging | RF/Magnetic |
| Reading Range | Short | Short | N/A | Short | Long |
| Line of Sight | Needed | Needed | N/A | Needed | Not Needed |
| Occlusion Resistance |  |  |  |  | + |
| Medication Information | + | + | + | + | + |
| Supply Chain Mapping |  |  |  | + | + |
| Data Privacy |  | + | + | + |  |
| Identification Capability | + | + | + | + | + |
| Pill Specific Information |  |  |  | + |  |
| Authentication Capability |  |  | + |  |  |
| Counterfeit Resistance |  |  |  |  |  |
| Adherence Monitoring |  |  |  |  |  |
| Cost | Low | High | High | Low | High |

As can be seen from Table 1, such existing technologies include visible markings, invisible ink markings, chemical/physical taggants, barcoding and RFID tagging. While each of these technologies has its benefits and limitations, the solution presented in accordance with the various embodiments of the invention (as will be described below) provides a beneficial combination of price, ease of use, precision and robustness.

An example of one of the technologies described in Table 1 is radio frequency identification (RFID) which uses electronic devices to track and identify items, such as pharmaceutical products, by assigning individual serial numbers to the containers holding each product. The U.S. Food and Drug Administration (FDA) is working towards an Electronic pedigree (ePedigree) system to track drugs from factory to pharmacy. This technology may prevent the diversion or counterfeiting of drugs by allowing wholesalers and pharmacists to determine the identity and dosage of individual products. Some techniques, such as Raman spectroscopy and Energy Dispersive X-Ray Diffraction (EDXR) can be used to discover counterfeit drugs while still inside their packaging. Other more traditional systems may be applied to such medication identification, such as barcoding being provided on medication packaging (either one or two dimensional). For such a use, however, any damage to the barcode, difficulty in printing the barcode (such as deformation based upon printing surface), or obscuring a portion of the barcode may render the barcode inoperative.

Marking individual pills with one or more identifiers is considered a useful method for identification, but has been traditionally thought of being cost prohibitive while offering only minimal improvement over packaging marking. One or more barcodes may be employed (either one or two dimensional) and may be printed to individual medication pills, instead of, or in addition to, being printed to the medication packaging. Such a printing process may be implemented by employing one or more appropriate printing apparatuses, such as a pad printing apparatus provided by Printing International® N.V./S.A., for example. Thus, each pill may be individually printed with the use of such a pad printing apparatus. Laser marking has also been used to print high-resolution images or barcodes directly onto pills. In consumable products, Mars®, Inc. utilizes inkjet or pad printers to print images cheaply onto individual pieces of candy. Indeed, U.S. Pat. No. 7,311,045 describes a system for printing multi color images on a candy by maintaining a directional registration of the candy between printing steps. In each instance, holding each individual medication pill or candy is performed by vacuuming the pieces in place, and holding the piece firmly in place between steps so that orientation of the piece during printing does not change. Other patents and applications assigned to Mars®, Inc. describe a number of systems and methods for printing food grade inks onto shaped candy elements.

While one or two dimensional barcodes have been used to serialize individual pills and verify authenticity and identity, the inventors of the present invention have recognized that their designs are relatively easy to replicate, require fixed surface areas and specific alignment for printing, and are rendered unusable if occlusion occurs due to handling or if the barcode is damaged. Unlike forensic features, which are embedded into an item, in barcode technology the item's physical attributes are completely distinct from the barcode itself. Further, whether using such a pad printing process, or employing other printing methods such as ink jet printing or laser marking for imparting markings to candy or medication pills, the inventors of the present invention have recognized that the need for purposefully handling individual pills may be time consuming and expensive. Further, the described printed elements may fail to provide robust images sufficient to act as a unique identifier for a particular batch of processed elements. For such a use, as noted, any damage to the barcode, difficulty in printing the barcode (such as deformation based upon printing surface), or obscuring a portion of the barcode may render the barcode inoperative. Traditional barcodes similarly may not be able to handle being printed on uneven surfaces where substantial noise may be generated by changes to the barcode from the printing surface, such as on a medication pill or the like. Additionally, barcodes may be easily copied and applied to counterfeit objects. None of these systems are sufficient for imparting robust identification information to a pill or other candy object.

There therefore currently exists no easy and reliable way to identify and authenticate medication pills. The widespread problem of counterfeit drugs and the huge number of medication errors within the health system are in large part due to an inability to correctly identify a medication pill. The packaging and labeling around a drug is no guarantee of authenticity. Trying to identify a pill based on its physical characteristics or imprint is almost impossible for the average consumer or healthcare worker.

Similar problems and issues arise with other products. Indeed, the existing solutions noted above may be applicable in any number of situations and to any number of products.

Therefore, it would be desirable to provide a method and apparatus that overcome the drawbacks of the prior art.

SUMMARY

In accordance with one or more embodiments of the present invention, a universal labeling system for labeling products or other objects is provided.

A universally applicable geometric code is also provided in accordance with the invention, the application of such code being universal, and not necessarily limited to medication pills and the like. The universally applicable geometric code is preferably based upon a theory of relative geometries, and preferably consists of one or more shapes within a shape, and including a plurality if such levels. Size and position of the one or more shapes within another shape are defined and may be extracted, thus providing various opportunities for coding of information. Any number of desirable levels may be defined and employed, limited only by printing and imaging technologies.

Such a universal geometric code may be applicable to medication tablets, other pills, other medication forms, or any other object.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 8 depicts imaging of one or more variants of the code marking array in accordance with an embodiment employing various parameters.

DETAILED DESCRIPTION OF THE PREFERRED EMBODIMENTS

The detailed embodiments of the invention will now be described making reference to the following drawings in which like reference numbers denote like structure or steps. Furthermore, while the invention is described as applying to medication pills in one or more types of containers, the invention should be considered applicable to any situation in which such a code may be employed, and may indeed be employed to protect any product or the like.

Code Definition

Figure 1:
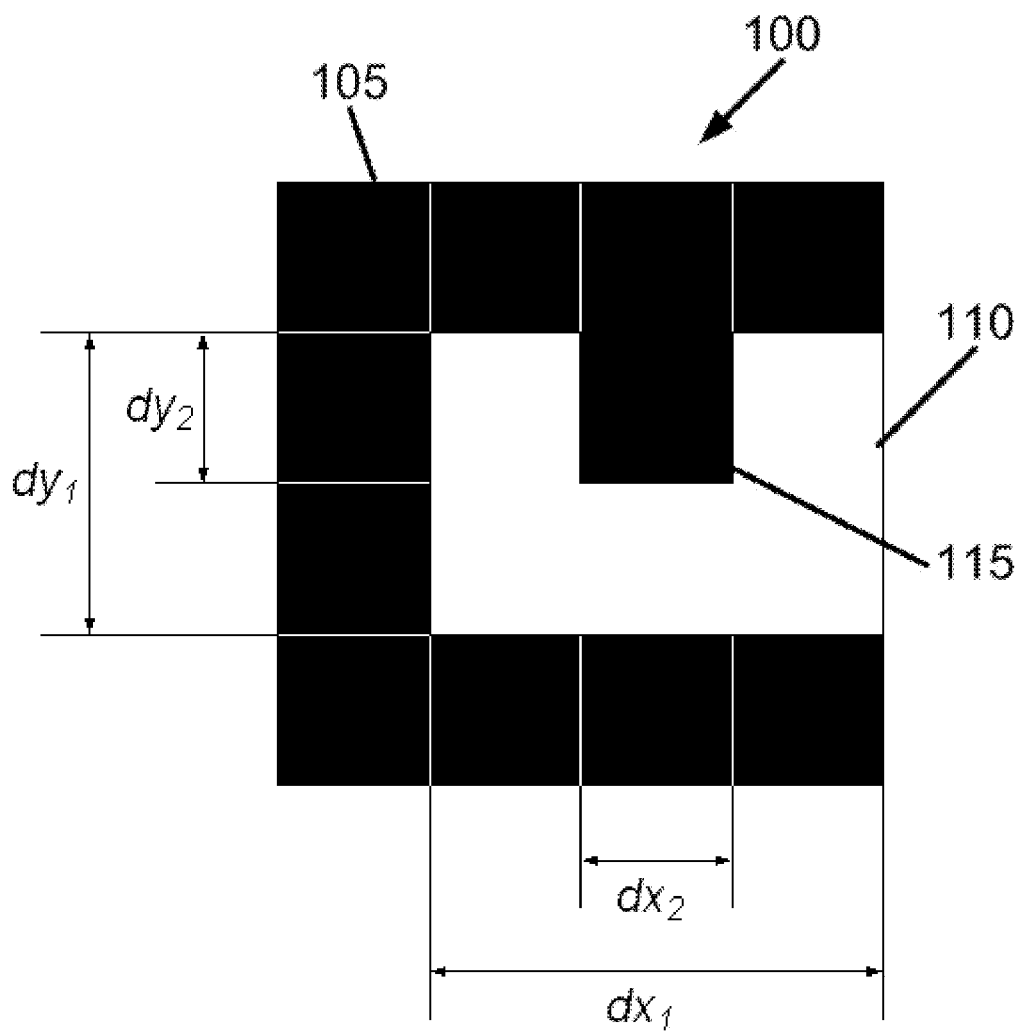
FIG. 1 depicts a size transformation of one or more portions making up a code in accordance with an embodiment of the invention.

As is first shown in FIG. 1, an inventive geometric code 100 in accordance with an embodiment of the invention preferably comprises one or more combinations of dimensions and translations of two rectangles located on a m×n cells base B (105). The base B is preferably colored black or employs some other pattern or indicator to differentiate the base B. A first rectangle R1 (110) is preferably colored white or some other contrasting color or pattern relative to base B (105). A second rectangle R2 (115) is preferably located inside R1 (110), and is preferably colored black or some other contrasting color to R1 (110). In a preferred embodiment, R2 (115) may employ a color, pattern or other indicator similar to that of base B (105). The exemplary embodiment shown in FIG. 1 depicts a cell base B (105) of 4×4 cells totaling 16 cells to define the code structure and parameters. The visible white grid depicted on the base is preferably provided for explanatory purpose only, and may not exist on the code itself when in actual use, but may be provided if desired.

Figure 2:
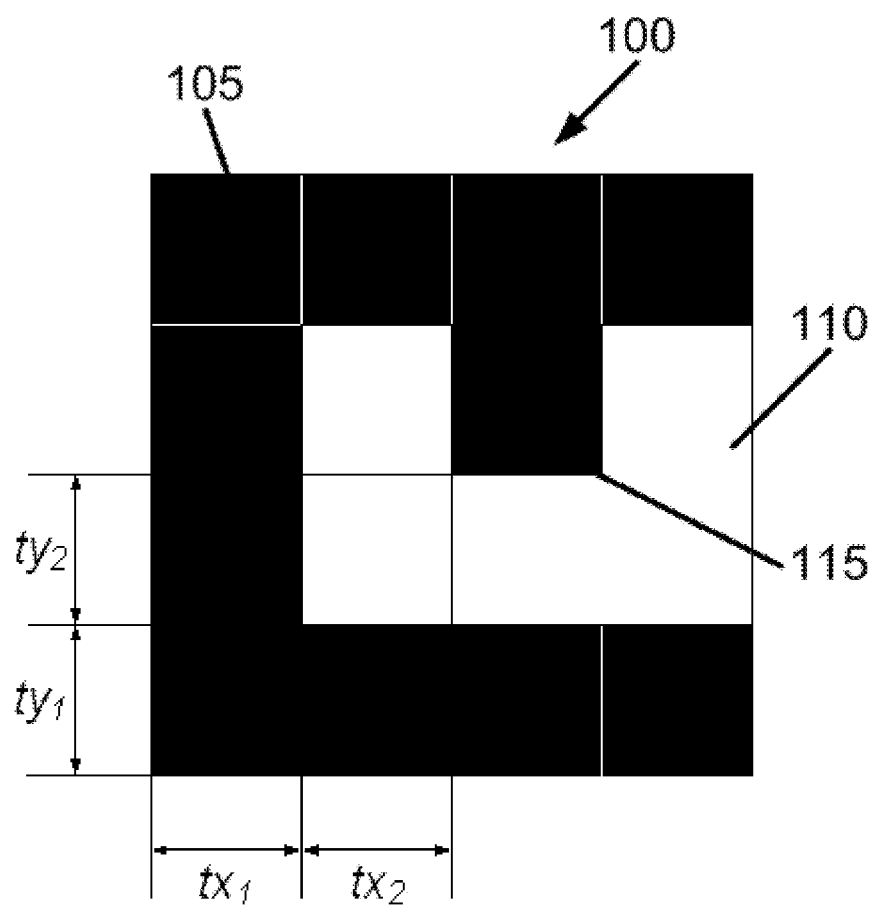
FIG. 2 depicts a translation transformation of one or more portions making up a code in accordance with an embodiment of the invention.

A size and positioning of R1 (110) is preferably defined as a change in size and position from base B (105), while a size and positioning of R2 (115) is preferably defined as a change in size and position from R1 (110), although a further change from base B (105) may also be used to define position and size of R2 (115) if desired. As is further shown in FIG. 1, the dimensions of R1 (110) are shown as $dx_1$ as a distance in the x direction and $dy_1$ as a distance in the y direction. Similarly, the dimensions of R2 (115) are shown as $dx_2$ as a distance in the x direction and $dy_2$ as a distance in the y direction. Referring next to FIG. 2, the translation of R1 (110) relative to B (105), and the translation of R2 (115) relative to R1 (110) are defined in FIG. 2. The translation of R1 (110) relative to B (105) is shown as $tx_1$ as a distance in the x direction and $ty_1$ as a distance in the y direction. Similarly, the translation of R2 (115) relative to R1 (110) is shown as $tx_2$ as a distance in the x direction and $ty_2$ as a distance in the y direction. A translation of R2 (115) relative to base B (105) may also be used to define position of R2 (115) if desired. Of course while a two level effect (including R1 (110) and R2 (115) relative to base B), any number of levels may be employed in such an exemplary code. Furthermore, any number of inscribed shapes R2 (115) may be employed relative to a single R1 (110), although only one is shown in the current embodiment. As will be further described below, the number of cells in the base B (105) may also be altered in order to properly support one or more desired objectives.

Geometric Code Representation

Each code is preferably represented by an eight (integer) coefficients vector $\tau$ $$\tau = \tau(dx_1, dy_1, tx_1, ty_1, dx_2, dy_2, tx_2, ty_2)$$

To eliminate ambiguities, the maximal size of R2 (115) is preferably limited to $(dx_1-1) \times (dy_1-1)$ so that it is defined as being smaller than R1 (110). Under these conditions $$dx_1, dy_1 = [1, 2, \ldots, m], [1, 2, \ldots, n] \text{ respectively}$$

$$tx_1, ty_1 = [0, 1, \ldots, m-1], [0, 1, \ldots, n-1] \text{ respectively}$$

$$dx_2, dy_2 = [1, \ldots, dx_1-1], [1, \ldots, dy_1-1] \text{ respectively}$$

$$tx_1, ty_1 = [0, 1, \ldots, dx_1-2], [1, \ldots, dy_1-2] \text{ respectively}$$

Geometric Code Variants

Geometric code variants are preferably defined by the number of their m×n grid numbers (Cmn). Three variants are presented below by way of example; additional variants can be defined and used as needed in accordance with one or more embodiments of the present invention. C33 is a m=3, n=3, 9 cells variant. The number of possible dimensions/translations combinations of this variant is $N_{C33}=108$. C44 is a m=4, n=4, 16 cells variant. The number of possible dimensions/translations combinations of this variant is $N_{c44}=681$. C35 is a m=3, n=5, 15 cells variant. The number of possible dimensions/translations combinations of this variant is $N_{C35}=546$.

Medication Marking Array

Figure 3:
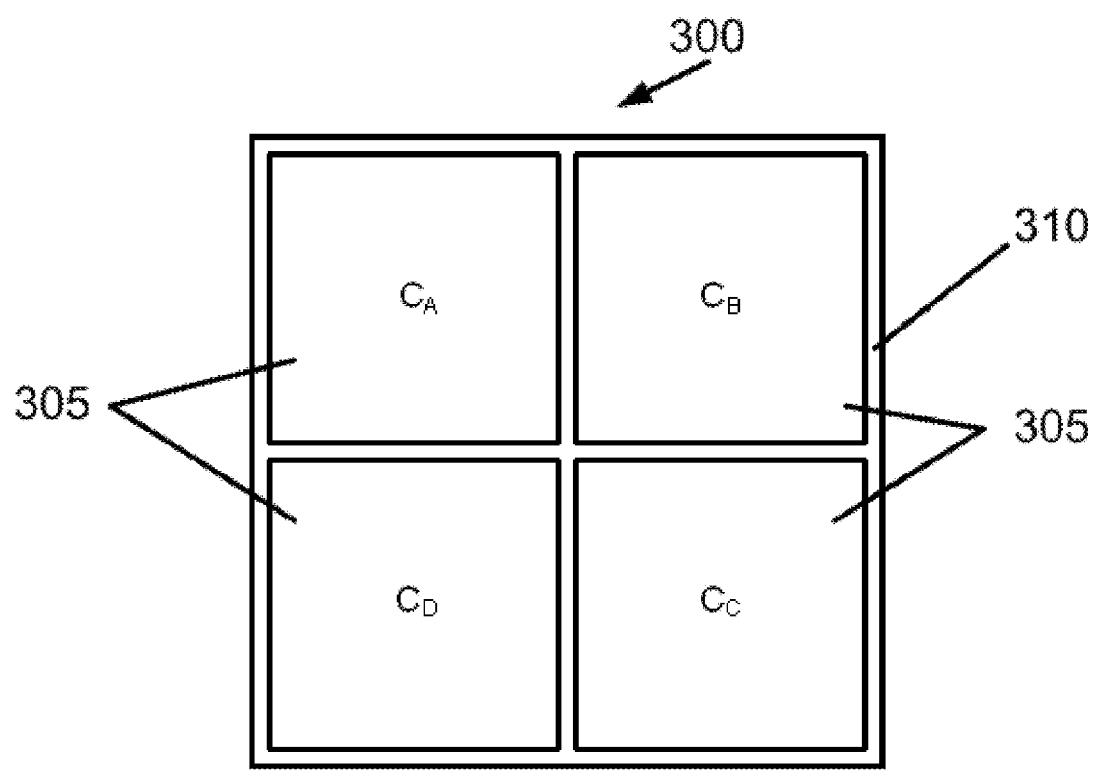
FIG. 3 depicts a code marking array in accordance with an embodiment of the invention.

As is shown in FIG. 3, a Medication Marking Array (MMA) 300 constructed in accordance with an embodiment of the invention preferably comprises of four geometric codes 305 ($C_A$, $C_B$, Cc, $C_D$, arranged in a four quadrants (either square or rectangle), 2×2, structure in accordance with a preferred embodiment, although any preferred number of geometric codes may be employed in any desired positional relationship. Of course, while labeled a medication marking array, the array may be applied to any object, and is therefore not limited to application to medication or the like. The quadrants may be preferably separated by a separating frame 310, as depicted in FIG. 3.

Figure 4:
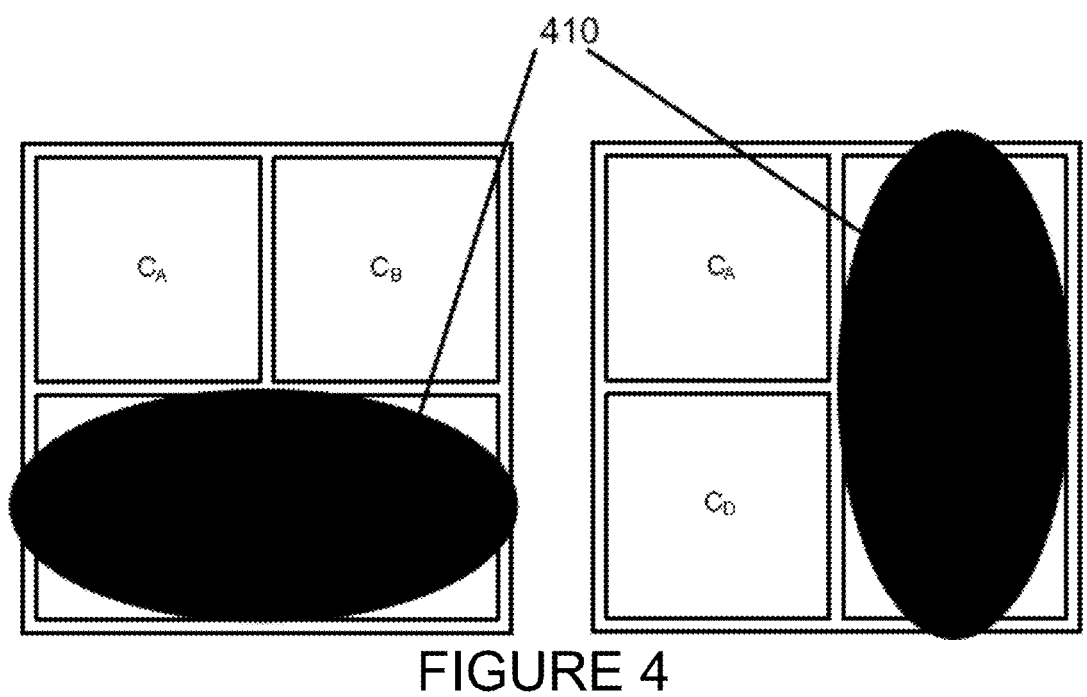
FIG. 4 depicts occlusion of the code marking array of FIG. 3 in accordance with an embodiment of the invention.

In a preferred embodiment of the invention, in order to increase a possible number of combinations available to the code while improving occlusion resistance and code redundancy to reduce potentially false positive results, it may be desirable to employ two copies of each of two geometric codes diagonally placed. When the MMA comprises two pairs of diagonally placed, substantially identical codes, as indicated in FIG. 3, $C_C = C_{A'}$, $C_D = C_{B'}$ (where $C_{A'}$, $C_{B'}$ indicate 180° rotated $C_A$, $C_B$ respectively), occlusion resistance of up to approximately 50% may be achieved, as depicted in FIG. 4. As is shown, covering of, or otherwise occluding (errors in the code, for example) up to 50% of the code with one or more occlusions 410 will still allow sufficient information to properly interpret the code. In the image at the left side of FIG. 4, both the $C_A$ and the $C_B$ codes are readable. In the image at the right side of FIG. 4, both the $C_A$ and $C_D$ codes are readable. Because of the diagonal position of the duplicate codes, a likelihood of both being occluded is slim, unless the entire printed MMA is occluded. This type of MMA supports a total of $N = N_{CA} \times N_{CB}$ code combinations.

Adaptation to Tablets' Size and Shape

Different code variants, defined by their m×n grid values, may be adapted to various sizes and shapes of tablets. Examples of the individual codes of varying sizes are described above, the use of two of these codes in a particular MMA (each presented twice therein) will result in the following:

a. For small size round tablets, MMA33, comprised of two different C33 codes, may be used. MMA33 supports $N_{33} = 108^2 \cong 11,600$ possible code combinations.

b. For medium/large size round tablets, MMA44, comprised of two different CC44 codes, may be used. MMA44 supports $N_{44} = 681^2 \cong 460,000$ possible code combinations c. For oval/elongated tablets, MMR35, comprised of two different CC35 codes, may be used. MMR35 supports $N_{35} = 546^2 \cong 390,000$ possible code combinations.

Orientation Anchors/Border

Figure 5:
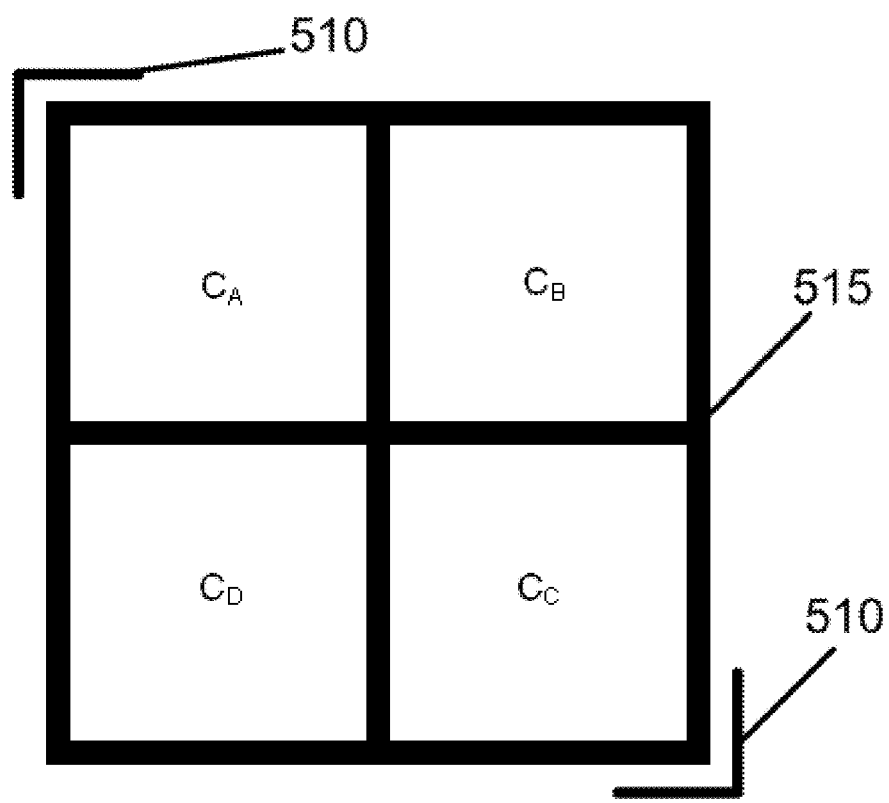
FIG. 5 is a code marking array including one or more anchor points in accordance with an embodiment of the invention.

In accordance with an embodiment of the invention, two anchors 510 may be placed in two opposite corners of the MMA (external to the coding area) to uniquely identify the orientation of the MMA structure. While in an alternative embodiment, one such anchor may be employed, the use of two such anchors provides an additional level of occlusion resistance. Additionally a border surrounding the outer edge of the MMA, and dividing borders between the four code areas may be provided. Such a border 515 is shown in FIG. 5, while FIGS. 3 and 4 show a line oriented border. Any number of colors, patterns, lined or the like may be employed, if a border is to be presented. Thus, anchors, borders, or both may be employed. Furthermore, simply the dividing borders between the code areas may be employed, thus simplifying the design. Use of full or only dividing borders may require further processing to determine relative orientation of the MMA, while anchors, if two are visible may provide such orientation. Similar orientation processing may be employed if one of the anchors is occluded.

Positive-Negative Variants

There exist four possible combinations of MMA base colors and separating frame colors, all being available in accordance with alternative embodiments of the invention. Of course, there are actually a large number of variants if different colors patterns or other differentiating features are applied.

a. Black base—black separating frame,
b. Black base—white separating frame,
c. White base—black separating frame,
d. White base—white separating frame.

Figure 6:
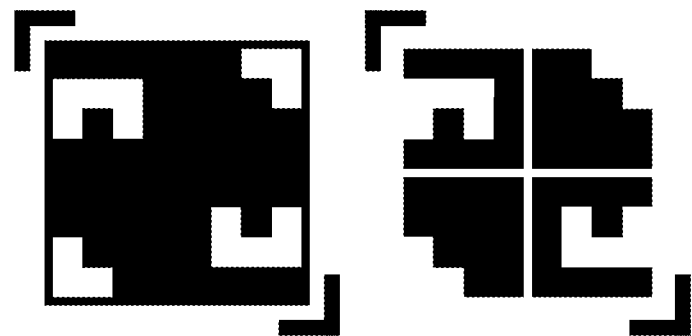
FIGS. 6(a) and 6(b) depict variants of the code marking array employing a black (or otherwise colored or patterned) base.
Figure 7:
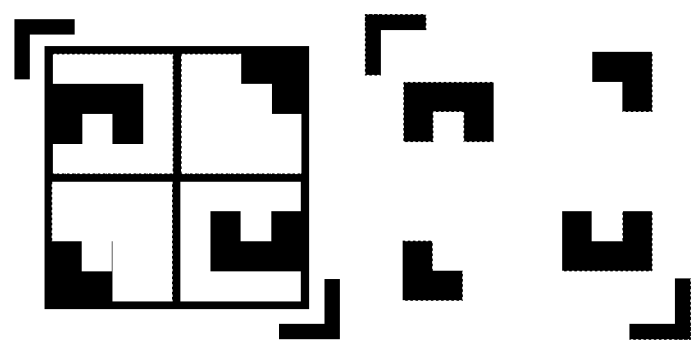
FIGS. 7(a) and 7(b) depict variants of the code marking array employing a white (or otherwise uncolored or unpatterned) base.

The anchors are preferably black in all combinations, but again, may be any color or pattern in accordance with one or more embodiments of the invention An example of geometric codes in accordance with an embodiment of the invention that employ a black (or other colored or patterned) base are depicted in FIG. 6. FIG. 6(*a*) presents a black base with a black separating frame, while FIG. 6(*b*) presents a black base with a white (or other non-colored or non-patterned) separating frame. Geometric codes in accordance with an embodiment of the invention that employ a white (or other non-colored or non-patterned) base are depicted in FIG. 7. FIG. 7(*a*) presents a white base with a black separating frame, while FIG. 7(*b*) presents a white base with a white separating frame. Anchors are shown, and are preferred when a white base and separating frame are employed, but may be employed or omitted as described above. The four positive-negative color or pattern variants can be used to increase the available number of code combinations and to discriminate between two square geometric codes, one with m×m grid value and the other with n×n grid value. As noted above, any particular color and/or pattern combination may be employed.

MMA Implementation

The inventive MMA code is scalable, which means that one can print it and read it in various dimensions—limited only by the resolution of the available printing and imaging techniques. The implementation of MMA codes for medication marking depends on a tradeoff between four parameters: a) on-tablet printing resolution; b) imaging resolutions; c) geometric code cell size; and d) number of geometric code cells.

Currently commercially available on-tablet pad printing technology supports two-color, 0.1 mm resolution printing. Typical current generation smartphones have 8MP rear camera and 1.2MP front-facing camera. A few examples of possible MMA variants dimensions (anchors excluded) are presented in Table 2. A separating frame width of 0.1 mm is used in all examples, although other widths may be employed.

TABLE 2

|  | Cell size (mm) | Code size (mm) | MMA size (mm) |
|---|---|---|---|
| MMA33 | 0.3 × 0.3 | 0.9 × 0.9 | 2.1 × 2.1 |
|  | 0.6 × 0.6 | 1.8 × 1.8 | 3.9 × 3.9 |
| MMA44 | 0.3 × 0.3 | 1.2 × 1.2 | 2.7 × 2.7 |
|  | 0.6 × 0.6 | 2.4 × 2.4 | 5.1 × 5.1 |
| MMA35 | 0.3 × 0.3 | 0.9 × 1.5 | 2.1 × 3.3 |
|  | 0.6 × 0.6 | 1.8 × 3.0 | 3.9 × 6.3 |

Geometric Code Imaging

A sample of 12 different C44 codes, using a cell size of either 0.3×0.3 mm or 0.6×0.6 mm, and a complete MMA44 code, imaged by the rear (8MP) and the front-facing (1.2MP) cameras of iPhone® 5 is presented in FIG. 8. As can be seen in FIG. 8, sufficient resolution is provided by each of the images (the smallest cell size of 0.3 mm×0.3 mm providing the most difficulty) to allow for proper recovery of the images.

It is contemplated in accordance with the various embodiments of the invention that advances in printing and imaging technologies will enable further reduction of the code cell size, facilitating either: a) MMA dimension reduction (for given m×n grid values); or b) increasing m×n grid values for a larger number of VLR code combinations. Indeed, the use of printing technologies such as nano printing, laser etching and the like and the like allow for a smaller printed image. Imaging technologies, such as macro lenses, microscopes, and simply increases in megapixels and improvements in noise reduction allow for these smaller images to be retrieved. Alternatively, for objects other than medication pills such as medication bottles or any other object, medical or not, the ability to print a larger image may further allow for the use of larger grid sizes (i.e. more cells in the grid) for the coded image cells, thus increasing the possible number of combinations or allowing for various error checking information to be provided therein.

A method of increasing the success rate of a system in accordance with an alternative embodiment of the invention comprises a system for doubling the number of code assets employed. In accordance with this alternative embodiment of the invention, this would preferably include determining a match between two identical, independent codes generated in accordance with the embodiment as described above. Thus, two identical codes (Code 1, Code 2) may be employed in order to mark a particular medication or other object. The two-code algorithm decodes both codes, and the possible results are presented in Table 3. As is shown in Table 3, the code "A" has been marked on the medication in two locations. An "A" in the table indicates that a code was properly imaged and read. A "B" in the table indicates that an incorrect (i.e. old, etc.) code has been retrieved. Other entries, such as "notA" and "invalid" indicate an imaged code that is not recognized at all.

TABLE 3

| Case # | Code 1 | Code 2 | Result |
|---|---|---|---|
| 1 | A | A | A - correct ID |
| 2 | B | B | B - wrong ID |
| 3 | notA(any) | any(notA) | Undecided |
| 4 | invalid(any) | any(invalid) | Undecided |

For positive medication identification, there should preferably be an agreement between the Code 1 and the Code 2 decoding results. In case #1 there is a (correct) match and the system declares medication A. In case #2 there is a (wrong) match and the system declares medication B, r indicates that the medication was not recognized. Cases #3 and #4 are undecided, and the system may preferably instruct the user to remove possible occlusion and repeat the identification procedure. If undecided again (possibly because of code erasion), the system may instruct the user to use a different pill.

For any given correct identification probability $P_{CORRECT}$, there exists the complementary wrong identification probability $P_{WRONG}=1-P_{CORRECT}$. The combined wrong identification probability of two independent codes is $P_{W2}=P_W^2$, therefore the combined correct identification probability is $P_{C2}=1-P_{W2}=1-P_W^2$. Wrong decoding of a single code comprises two components:
  a. Invalid shape, with probability $P_{IS}$
  b. Valid shape error, with probability $P_{VSE}$ The combined error of two-code decoding of two identical, independent codes is given by Eq. 1.

$$P_{W2}=(P_{IS1}+P_{VSE1})\times(P_{IS2}+P_{VSE2})P_{IS1}P_{IS2}+P_{IS1}P_{VSE2}+P_{VSE1}P_{IS2}+P_{VSE1}P_{VSE2} \quad (1)$$

The first three terms of Eq. 1 contain invalid shape probabilities, therefore recognizable by the identification algorithm. Only the last term generates valid, although wrong, coefficients vector. Since the probability of an erroneous cell identification (leading to an invalid shape or to a valid shape error) is uniformly distributed over the m×n code cells, we can assume that $P_{IS1}=P_{IS2}=P_{VSE1}\ P_{VSE2}\ P$. Therefore, $$P_{IS1}P_{IS2}=P_{IS1}P_{VSE2}=P_{VSE1}P_{IS2}=P_{VSE1}P_{VSE2}=P^2 \quad (2)$$

And consequently, the probability of unrecognizable, wrong, medication identification is $$P_{VSE1}P_{VSE2} = \frac{P_{W2}}{4} \quad (3)$$

(3)
As an example, for $P_C=97\%$; $P_W=3\%$, one gets $P_{C2}\cong 99.9\%$; $P_{W2}\cong 0.10\%$, giving wrong medication identification probability of $$P_{VSE1}P_{VSE2} = \frac{P_{W2}}{4} = 0.025\% \ (2.5 \text{ out of } 10{,}000).$$

Code Scanning

The scanning process for these generated codes involves the following steps: 1) segmentation; 2) partitioning; 3) gray-level computation; 4) code recovery; 5) code verification; and 6) code matching.

1) Segmentation—Given an image containing a code, the square region containing the code should first be segmented.

Any computer vision technique may be used for this step including blob detection, rectangle detection, or segmentation methods (watershed, graph-cut, histogram analysis, etc.).

2) Partitioning—one or more codes generated in accordance with this invention are then preferably analyzed quadrant-by-quadrant; therefore, once the code has been segmented, it is further partitioned into quadrants. If a border and/or separator were also printed, then they must be accounted for when partitioning.

Once the code has been partitioned into quadrants, each quadrant is preferably partitioned by an n×n grid, where n is the parameter used in code generation. If n is unknown, then multiple grids with varying values of n may be used to partition each quadrant, and the value of n used to generate the image may be determined in the next step.

FIG. 9(a) illustrates a binarized image 910 containing a code 915 provided in accordance with an embodiment of the invention. In accordance with the above description, the code is provided with a C44 code, and a 2×2 matrix of codes, and including a border and separator. FIG. 9(b) depicts such an image 920 after imaging, and having a grid 925 provided thereon to illustrate the partitioning process. The codes were segmented using a rectangle detection method. A border and separator were drawn. The grid illustrates how these separators and border are accounted for when partitioning the quadrants.

Figure 9:
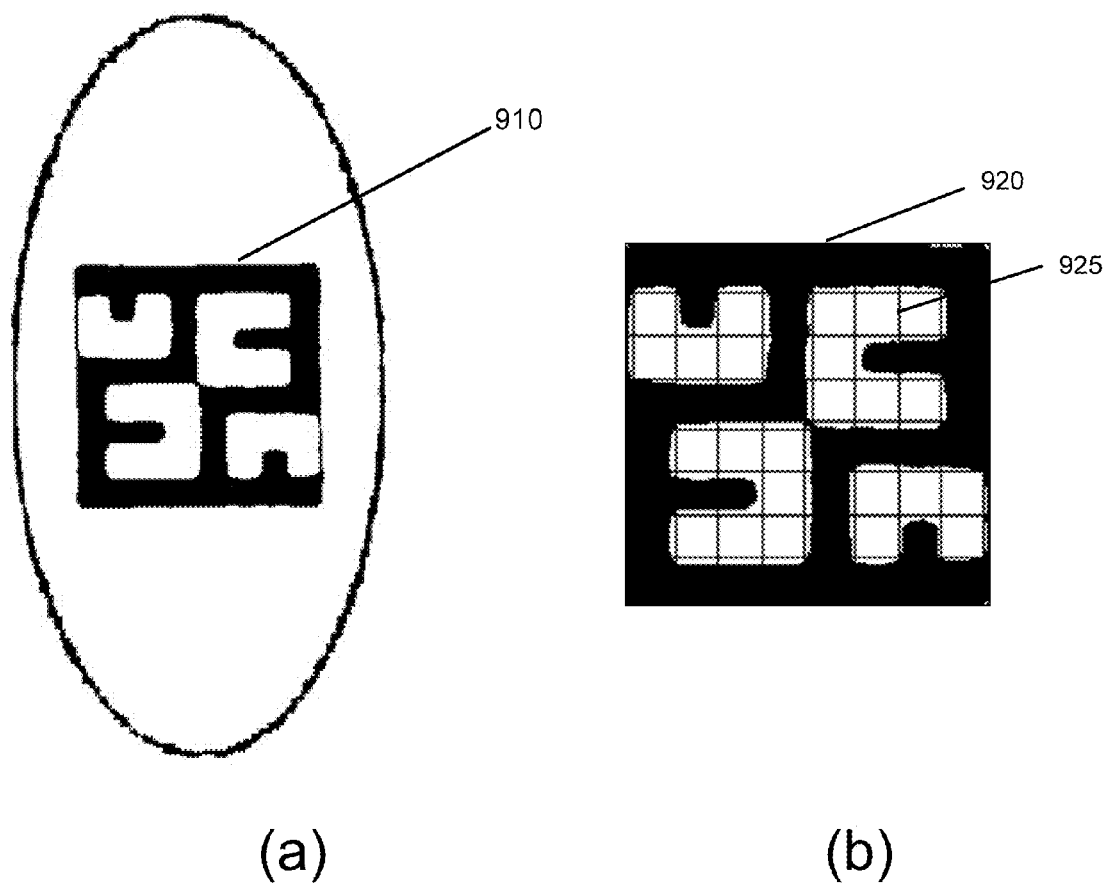
FIGS. 9(a) and (b) depict a binarized code and grid provided thereon in accordance with an embodiment of the invention.
Figure 10:
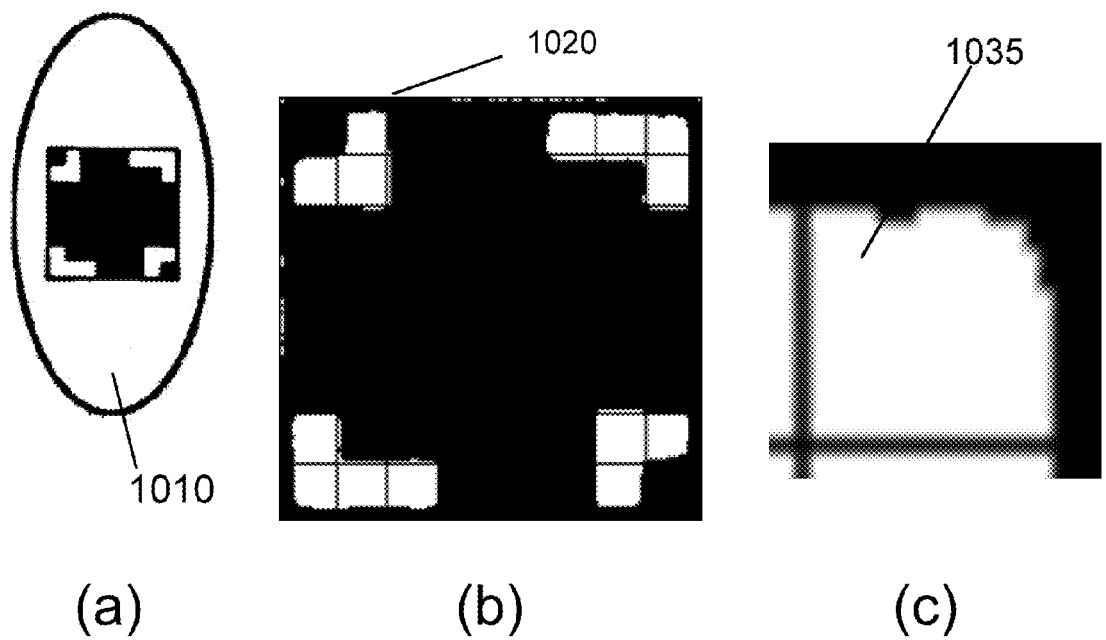
FIGS. 10(a), (b) and (c) depict a binarized code, a grid provided thereon, and a close up of one segment thereof in accordance with an embodiment of the invention.

3) Gray-level computation—During code generation, each grid cell of a code constructed in accordance with an embodiment of the invention is colored one of two colors. After binarization of an image, the colors are converted into black or white or other desired colors. Therefore, after segmentation, the gray-level value of each grid cell of each quadrant must be computed. As FIG. 9 illustrates, image processing will produce segmented codes where a grid cell may not be completely black or white. This is problematic if gray-level values are computed using the arithmetic mean (or simply mean). In FIG. 10(a) a similar binarized image 1010 on a pill is shown. In FIG. 10(b) the binarized image is shown with a grid 1020 superimposed thereon. If FIG. 10(c) the upper-right grid cell 1035 of the upper-right quadrant has been enlarged. Clearly, there are a large number of black pixels in this grid cell, which is supposed to be white. The mean gray-level value is 181, which is closer to gray (128) than white (255). The closer the gray-level is to gray, the more likely the scanning method is to misread the VLR code.

Examining the grid cells in FIG. 10(b), it becomes clear that errors in scanning will come from the pixels along the edges of grid cells. To account for this, a weighted mean may be used instead of the arithmetic mean. Weighted means assign different values (or weights) to pixel intensity values depending on their location. For example, a weighted mean using a Gaussian filter was used on the same grid cell from FIG. 10(c); a Gaussian filter gives more weight to pixels in the center of the grid cell then along the edges. The weighted mean gray level is 244, very close to white.

To prevent misreading of a code, a threshold parameter(s) may be set for gray level values of grid cells. If a grid cell's gray level value is below (for white) or above (for black) the threshold parameter, the grid cell color is labeled as unknown, and the scanning procedure may be stopped. The user may be prompted to provide another image of the VLR code for scanning.

As mentioned above, if the value of n used to generate the VLR code is unknown, multiple grids for different values of n may be used to partition the quadrants. The gray-level computation step may be performed for each grid. If any grid cell gray levels for a partition do not meet the threshold parameter, then the value of n used to generate the grid is rejected. If multiple values of n result in grid cells which all meet the threshold parameter, then additional criteria such as $$\min_n \left( \max_{g \in G_1} (\Delta g), \max_{g \in G_2} (\Delta g), \ldots, \max_{g \in G_n} (\Delta g), \right)$$

where G is a set of grid cells for a value of n, g is a grid cell in G, and $\Delta g$ is min(g, 255−g); or $$M_n(\|\Delta G_1\|_2, \|\Delta G_2\|_2, \ldots, \|\Delta G_n\|_2)$$

where $\|\Delta G_n\|_2 = (\Sigma_{i=1}^2 \min(g_i, 255-g_i))^{1/2}$ is the $L_2$-norm of the distances from black/white of each grid cell $g \in G_n$ or any other appropriate method may be used to identify the value of n which results in the most accurate determination of gray-level values of grid cells.

4) Code Recovery—Once the gray-level value of each grid cell has been computed, a code may be read quadrant-by-quadrant. The reading method for an individual quadrant is illustrated in Table 4. A table has been setup with the grid color of each grid cell in the upper-left quadrant of the code from FIG. 1.

TABLE 4

| | | | |
|---|---|---|---|
| Black | Black | Black | Black |
| White | Black | White | Black |
| White | White | White | Black |
| Black | Black | Black | Black |

The table will preferably be read top-down to recover the x-parameters, and then left-right to recover the y-parameters. Parameters for the 1st (white) rectangle will be recovered first, and then the parameters for the 2nd (black) rectangle will be recovered.

The 1st parameter is tx1, the vertical translation of the 1st rectangle. If tx1=0, then there will be white grid cells in the first row. If the first row does not contain a white grid cell, tx1 is incremented by 1 and the next row is checked. This process continues until a row containing a white grid cell is detected. If none of the grid rows contains a white grid cell, then the VLR code has been misread and scanning is stopped.

Once tx1 has been computed, the next parameter is dx1, the height of the 1st rectangle. For dx1=2, . . . , n, there must be dx1 contiguous rows containing a white grid cell. Once the first row containing a white grid cell has been detected, we set dx1=1. If the next row contains a white grid cell, dx1 is incremented and the next row is checked. This process preferably continues until a row containing all black grid cells is detected, or all rows have been checked. If $dx_1=1$, then the VLR code has been misread and scanning is stopped.

After dx1 has been computed, we compute the y-parameters of the 1st rectangle, ty1 and dy1. These are computed in a similar manner to tx1 and dx1 using the columns of the grid and reading left-to-right. Using the example in FIG. 3, we would have (dx1, dy1, tx1, ty1,)=(2, 3, 1, 0).

Once the parameters for the 1st rectangle have been computed, we segment the rectangular region containing the 1st rectangle from the table in FIG. 3, and use a similar process as described above to compute (dx2, dy2, tx2, ty2,)=(1, 1, 0, 1). Table 5 illustrates the segmented rectangular region containing rectangles 1 and 2.

TABLE 5

| White | Black | White |
|-------|-------|-------|
| White | White | White |

Figure 11:
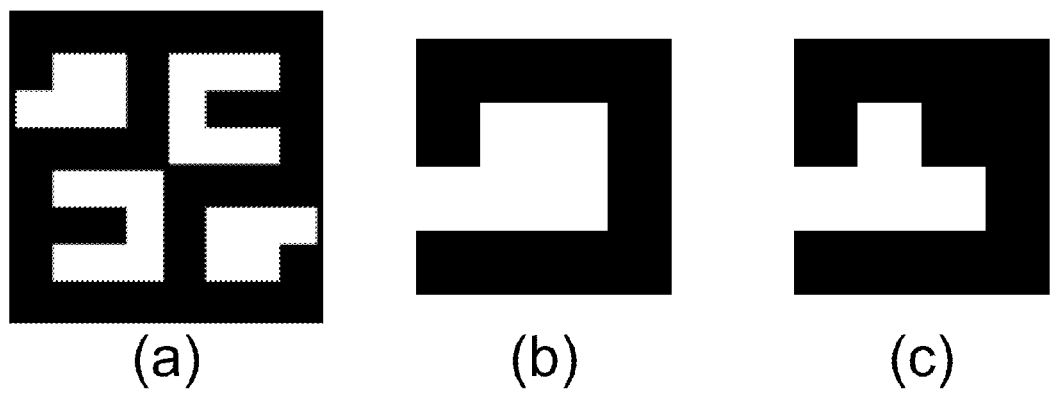
FIGS. 11(a), (b), and (c) depict a code, valid quadrant and invalid quadrant in accordance with an embodiment of the invention.

5) Code Verification—By definition, the parameters of each quadrant of a code preferably must meet certain requirements. These are $dx_1=2, \ldots, n$
$dy_1=2, \ldots, n$
$tx_1=0, \ldots, n-dx_1$
$ty_1=0, \ldots, n-dy_1$
$dx_2=1, \ldots, dx_1-1$
$dy_2=1, \ldots, dy_1-1$
$tx_2=0, \ldots, dx_1-dx_2$
$ty_2=0, \ldots, dy_1-dy_2$ If the scanning results noted above do not meet these requirements, then scanning is preferably stopped. The user may be prompted to provide another image of the code for scanning, if appropriate, in accordance with one or more embodiments of the invention Code Matching—Even if a segmented code passes through all the steps listed above, the code may still be invalid or misread. FIG. 11(a) depicts a valid code provided in accordance with an embodiment of the invention, while FIG. 11(b) depicts a close up of the left upper quadrant thereof. FIG. 11(c) represents an "invalid" quadrant in which one of the white cells in FIG. 11(b) has been colored black. This code is invalid because it cannot be generated by the process noted above in accordance with the embodiments of the invention. While invalid, this invalid code may still be read. A white grid cell in the upper-left quadrant has been colored black, resulting in FIG. 11(c), a quadrant with an invalid configuration. However, the scanning method previously described would still read the quadrant and return $(dx_1, dy_1, tx_1, ty_1, dx_2, dy_e, tx_2, ty_2,)=(2, 3, 1, 0, 1, 1, 1, 0)$, which would generate the quadrant in b). Thus, even though invalid, the code would still return a correct result.

As a final check to ensure that the code has been correctly read, or rejected if it's invalid, the code that resulted from the code recovery step may be used to generate a corresponding code. This code may then be checked against the segmented code extracted from an image. Each grid cell of the segmented code may be checked against the corresponding grid cell of the generated code to determine if the colors match. If they do, then the code generated from the segmented code is accepted. If not, then the scanning procedure may be stopped. The user may be prompted to provide another image of the code for scanning.

Additionally, if similar codes are employed in the matrix, a further check may be employed in order to further confirm that these component codes match, and thus as noted above can improve resilience false positive results.

It is further contemplated that any remote or local processing computer has sufficient processing hardware, software, memory and data transmission and receiving system to perform the features noted herein, and including the decoding of any imaged code. Such processing may be performed locally, remotely, in a cloud based system, or on any combination thereof. Thus, imaging devices for imaging the various codes may include mobile device cameras, microscopes, scanners and the like. Processors may be positioned locally or remotely, and may comprise any necessary computing and storage components, including storage devices, input output ports displays, computer processors and software algorithms or programs to operate the processors. The invention further comprises one or more of such processors and associated non-transitory computer readable storage media available to store any desired computer program, thus causing one or more of the processors to perform a sequence of steps in accordance with the computer program.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description and following claims are intended to cover all of the generic and specific features of the invention herein described and all statements of the scope of the invention which, as a matter of language, might be said to fall there between.

What is claimed:

1. A system for reading a code from an object, comprising:
   an imaging apparatus for imaging a code printed to an object, the code being defined by defining a first geometric shape, defining a size of a second geometric shape as a reduction in size from the first geometric shape, defining a position of the second geometric shape within the first geometric shape as a change in position from the first geometric shape, defining a size of a third geometric shape as a reduction in size from the second geometric shape, defining a position of the third geometric shape within the second geometric shape as a change in position from the second geometric shape;
   a processor for processing the imaged code, the processor segmenting the imaged code, partitioning the segmented imaged code, determining a gray level of each portion of the partitioned segmented imaged code, and determining a code represented by each segmented portion of the partitioned segmented imaged code.

2. The system of claim 1, wherein the processor further verifies that the determined code is a valid code by confirming that the determined code meets a predefined set of constraints.

3. The system of claim 2, wherein the processor further matches the determined code to one of a plurality of possible codes.

4. The system of claim 1, wherein the object on which the code is imprinted is a medication tablet.

5. The system of claim 1, wherein each portion of the partitioned segmented imaged code comprises a predetermined grid having a predetermined length and width.

6. A non-transient computer readable storage medium having a computer program stored thereon, the computer program causing a general purpose computer to perform the steps of:
   receiving an imaged code from an imaging device;
   segmenting the imaged code;
   partitioning the segmented imaged code into four quadrants;
   determining a gray level of each portion of the partitioned imaged segmented code;
   determining a code represented by each segmented portion of the partitioned imaged segmented code;
   verifying that the determined code is a valid code by confirming that the recovered determined code meets a predefined set of constraints; and
   matching the determined code to one of a plurality of possible codes.

7. The computer readable storage medium of claim 6, wherein two diagonally positioned quadrants contain a similar code stored therein.

8. The computer readable storage medium of claim 6, wherein the portions of the partitioned imaged segmented code are defined by a grid overlaid thereon.

9. A non-transient computer readable storage medium having a computer program stored thereon, the computer program causing a general purpose computer to perform the steps of:
- receiving an imaged code from an imaging device;
- segmenting the imaged code;
- partitioning the segmented imaged code;
- determining a gray level of each portion of the partitioned imaged segmented code;
- determining a code represented by each segmented portion of the partitioned imaged segmented code;
- verifying that the determined code is a valid code by confirming that the determined code meets a predefined set of constraints; and
- matching the determined code to one of a plurality of possible codes;
- wherein the step of determining a gray level of each portion of the partitioned segmented imaged code further comprises the steps of:
- counting a number of colored pixels in the portion of the partitioned imaged segmented code;
- determining a ratio of colored to non-colored pixels in the portion of the partitioned imaged segmented code; and
- comparing the determined ratio to a predetermined threshold to determine whether the portion of the partitioned segmented imaged code is a colored portion.

* * * * *